United States Patent [19]
Dufraisse

[11] Patent Number: 5,700,124
[45] Date of Patent: Dec. 23, 1997

[54] APPARATUS FOR COLLECTING AND TRANSPORTING BALES AND FOR FEEDING A BALE WRAPPING MACHINE

[75] Inventor: Charles Dufraisse, Thiviers Eyzerac, France

[73] Assignee: Societe C.G.A.O., La Coquille, France

[21] Appl. No.: 508,267

[22] Filed: Jul. 27, 1995

[30] Foreign Application Priority Data

Jul. 27, 1994 [FR] France ................... 94 09406
Mar. 24, 1995 [FR] France ................... 95 03734

[51] Int. Cl.⁶ ........................................... B60P 1/36
[52] U.S. Cl. .................... 414/111; 53/588; 414/514; 414/552
[58] Field of Search .................. 414/24.5, 24.6, 414/487, 514, 517, 552; 53/588

[56] References Cited

U.S. PATENT DOCUMENTS

| | | |
|---|---|---|
| 3,942,666 | 3/1976 | Pfremmer ................ 414/24.5 X |
| 4,042,140 | 8/1977 | Mc Farland . |
| 4,050,598 | 9/1977 | Schurz . |
| 4,329,102 | 5/1982 | Gray ...................... 414/24.5 |
| 4,793,124 | 12/1988 | Anderson ................. 53/588 |
| 5,012,631 | 5/1991 | Hostetler et al. ......... 53/588 |
| 5,340,259 | 8/1994 | Flaskey .................. 414/24.5 |

FOREIGN PATENT DOCUMENTS

| | | |
|---|---|---|
| 1073218 | 3/1980 | Canada . |
| 2260276 | 9/1975 | France . |
| 2620300 | 3/1989 | France ............... 414/24.5 |
| 2226075 | 12/1973 | Germany . |
| 2192172 | 1/1988 | United Kingdom . |

*Primary Examiner*—Janice L. Krizek
*Attorney, Agent, or Firm*—Greenblum & Bernstein, P.L.C.

[57] ABSTRACT

The invention concerns an agricultural device able to be moved by a tractor and provided with a hydraulic apparatus for collecting and transporting manufactured bales with the aid of a baling press and for continuously feeding a banding machine with the bales collected, wherein it includes a trailer fitted with a loading device, at least one ramp for receiving the bales, and an arrangement for moving the bales on the ramp.

18 Claims, 4 Drawing Sheets

1

APPARATUS FOR COLLECTING AND TRANSPORTING BALES AND FOR FEEDING A BALE WRAPPING MACHINE

FIELD OF THE INVENTION

The present invention concerns a device for collecting and transporting bales and continuously feeding a banding machine with the bales collected.

BACKGROUND OF THE INVENTION

There currently exist continuous banding machines as described in the patent application GB-A-2 192 172. These machines have been designed so as to continuously place a plastic film around fodder bales made with a bale press and aligned with each bale following the other along their winding axes. These bales are cylinders whose diameter is approximately identical to their height.

A known type of banding machine includes a feeding platform on which a bale picked up in the field with the aid of a fork of a tractor is placed, the bale being pushed generally by a jack so as to have it pass through a banding machine ring which simply includes an automatic film unwinder. The bale is pushed onto the other side of the ring as it is gradually wound by the film, the forward speed and unwinding speed of the film being synchronized so as to obtain the desired result and in particular a suitable superimposing of the film layers.

Once the first bale has been tied up, a second bale is placed on the receiving platform and receives the thrust from the jack, which has the effect of making the second bale pass through the banding machine ring but also of pushing the first bale as the second bale rests on the first so as to embody a continuous fodder and /or straw cylinder.

For the following description and the claims, fodder is understood to be any plant able to be preserved in a dry state or a humid state for ensiling inside a plastic film type protective system.

As it is gradually being formed, the cylinder is placed in the field at a location previously decided upon by the farmer.

The chassis supporting the banding machine is mounted on wheels so as to be able to move it and generally includes a removal platform contiguous with the banding machine ring and slanted until it is immediately close to the ground which gradually receives the roll as it is formed. This removal platform includes rollers which enable the roll, whose outer surface is a plastic film, to be moved without the film being torn.

As more bales are gradually added, the jack moves by means of a reaction effect the trailer of the banding machine so that the cylinder remains in place, whereas the trailer moves backwards, which prevents the cylinder and thus the film on the ground from shifting.

Certain banding machines comprise integrated motorization which supplies the hydraulic power required for operating the various actuation devices and in particular the jack and the automatic film unwinder.

This banding operation is highly valued by farmers, but to be successful it must be carried out at a specific time depending on the type of product to be tied up and in particular as quickly as possible after the bales come out of the baling press.

This proves to be a long and tedious operation since the farmer must move about over the entire field to pick up the bales one at a time and this is even more valid when it involves a large farming area and/or when the weather is deteriorating and there is very little time left for the work to be done.

2

It is possible to gather the bales all together on a single trailer but in this case more equipment is needed since a first tractor is needed for handling the bales both for loading and unloading, and a second tractor is required for moving the trailer. In fact, a sole tractor used for both operations shall result in losing more time.

Secondly, the banding machine shall be initially started and simultaneously supplied with bales, which requires that the farmer has to get up and down a large number of times or employ additional workers to carry out this simple operation.

SUMMARY OF THE INVENTION

The purpose of this invention is to reduce these difficulties by offering a picking-up device for transporting and supplying bales from a banding machine or any other machines for processing the bales. Moreover, an improvement of the device of the invention enables motorization of the banding machine to be dispensed with by using the hydraulic power of the tractor.

The device of the invention offers many advantages since it allows for a reduction in the number of the use of essential equipment, a reduction in the production and running costs of the items or equipment used, a reduction in the number of workers and also improves the working conditions of the workers involved. It particularly allows the work to be carried out quickly and the products stored in optimal conditions.

To this effect, the agricultural device of the invention, able to be moved with the aid of a tractor equipped with a hydraulic apparatus for picking up and transporting manufacturing bales by means of a bale press and supplying continuously a banding machine with the picked up bales, includes a trailer equipped with loading means, at least one ramp guide way for receiving the bales and means for shifting the bales on the ramp.

According to another characteristic, the trailer includes a coupling with an orientable drawbar.

According to a first characteristic of the invention, the trailer includes two juxtaposed ramps parallel to the longitudinal axis of the trailer and a central separator with holding and bale guiding side rails, as well as means for maneuvering the bales placed on each ramp respectively from front to back and back to front.

In this case, one of the ramps is pivot-mounted around an axis parallel to the longitudinal axis of the trailer close to the separator equipped with maneuvering means so that the ramp can move to a first low position parallel to the plate and a second position slanted with respect to the plate towards the juxtaposed ramp.

According to another embodiment, the ramp may be slanted and fixed.

According to another variant, the trailer includes a single ramp equipped with rollers and means for moving the bales and including a closed loop chain tightened between two capstans on both sides of the median longitudinal axis of the trailer, the chain bearing regularly spaced bars for pushing the bales.

According to one preferred embodiment of the invention, the loading means include a fork fitted with teeth parallel to the longitudinal axis of the trailer and secured to the arms perpendicular to the longitudinal axis of the trailer. These arms are fitted with maneuvering means and pivoting mounted around an axis parallel to the longitudinal axis of the trailer between a first position where the fork is at the level of the ground and a second position where the arms are raised.

An improvement of the present trailer makes use of fluid connectors adapted in such a way as to cooperate with conjugated connectors disposed on the banding machine, the connectors being provided for automatic connection/ disconnection.

It is also possible to provide a central separator whose upper portion includes an upturned V.

It is also possible to provide a separator with maneuvering means comprising joints at the top and bottom of each pole so as to embody a parallelogram able to be deformed with respect to the plate whose folded or raised positions are obtained with the aid of a jack.

BRIEF DESCRIPTION OF THE DRAWINGS

There now follows a non-limitative description according to one particular embodiment matched with variants with reference to the attached drawings containing the following figures.

DETAILED DESCRIPTION OF THE PREFERRED EMBODIMENTS

Figure 1:
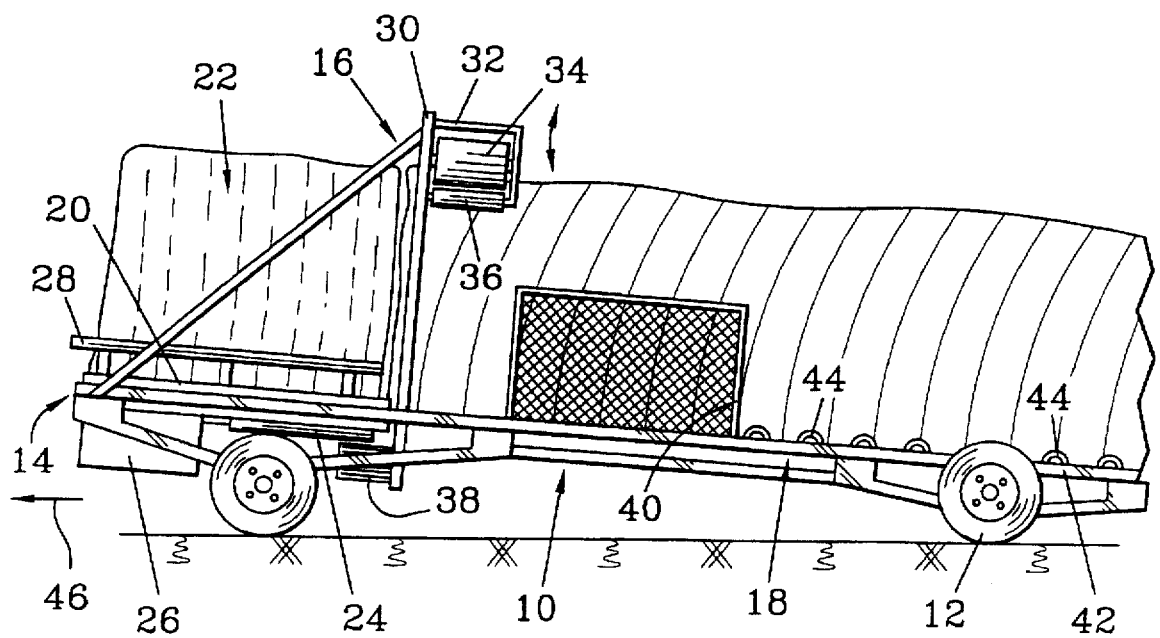
FIG. 1 is a view of the banding machine similar to the one used with the device of the invention.

FIG. 1 shows a simplified version of the banding machine which includes the various elements required for the various functions without showing the additional elements required for the full industrial production of this machine.

A frame 10 mounted onto the wheels 12 includes a feeding platform 14, a fastening ring 16 and an evacuation platform 18.

The feeding platform 14 comprises a plate 20 on which the bale 22 is laid, as shown, and also a jack 24 for pushing the bale through the fastening ring 16.

An automatic motorization device 26 enables hydraulic power to be fed to all the actuation elements via a distribution network (not shown for the purpose of clarity).

Rails 28 ensure guiding of the bale and stops it from rolling sideways.

The banding roll comprises a braced fixed annular support 30 integral with the frame in which a carriage 32 rotates and bearing a film reel 34 with the necessary tension rollers 36.

A hydraulic motor, shown at 38, makes the carriage rotate along the annular fixed support 30 and, more particularly, ensures rotation of the second annular support (not shown) coaxial with the first and second supports it guides, the carriage 32 being integral with the second support.

A rail 40 also ensures guidance at the outlet of the banding machine ring 16.

The evacuation platform 18 includes a ramp 42, slanted or able to be slanted, equipped with rollers 44 allowing for movement of the banded bale cylinders.

The bale is placed on the plate or platform 20 and then the jack moves it through the banding machine ring. The carriage 32 is rotated after having started winding on the end of the bale.

As the bale moves forward, after the cylinder has been formed and the bale has been placed on the ground at the end of the formation of this cylinder, the frame moves back in the direction of the arrow 46, whereas the cylinder remains immobile with respect to the ground.

The device of the invention includes a trailer 50 with a plate a frame 52 mounted on wheels 54 and equipped with an orientable drawbar 56 and loading means 58.

The plate 52 in this first embodiment includes two ramps or guideways 60 and 62 juxtaposed and parallel to each other along the longitudinal axis of the trailer, the axis extending in the direction of displacement imposed by the wheels.

These two ramps or guideways 60 and 62, preferably but not necessarily, have lower supporting surfaces in the form of rollers 64 orientated transversally so as to permit an easy translation movement along the longitudinal axis or parallel to the latter.

The ramp 60 placed on the right side with respect to the forward movement direction is rotary-mounted around a spindle 66 parallel to the longitudinal axis and immediately close to the central median axis of the plate 52.

Two lateral rails 68 and 70 of the ramps/guideways guide the bales and prevent them from falling, this guiding to be explained later in the description.

The ramp 62 placed on the left is fixed with respect to the plate of the trailer.

A central separator 72 placed between the two ramps 60 and 62 includes means 74 for retracting the separator at the surface of the plate. These retraction means are symbolically represented on FIG. 3 in the form of a jack which moves the separator between a first upper position where it projects above the plate and separates the two chutes defined by the two ramps 60 and 62, and a bottom position where the separator is retracted placing the two chutes in communication. This possibility of retraction is symbolized by the double arrow 73.

One can see the special form of the separator which comprises on top an upturned V which facilitates separation of the bales from both rows and which also facilitates the lifting of the separator.

Each passage comprises moreover means for maneuvering the bales situated on the right 76 and left 78, symbolically represented by a jack for the maneuvering means 76 on the right and by a broken line for the maneuvering means 78 which comprise a chain with a plate forming a thrustor, this chain being well known in the prior art and also used in the variant to be described subsequently.

The maneuvering means situated on the left 76 move the bales from the front towards the rear and the maneuvering means on the left 78 move the bales from the rear towards the front.

The coupling 56 comprises a known type of drawbar 80 but it is pivotable and equipped with orientation means 82 within the horizontal plane so as to be able to offset the tractive power. The orientation means comprise a jack whose initial position of the piston corresponds with the normal position of the drawbar in a central position parallel to the longitudinal axis of the trailer and the extending position of the piston corresponds to an angular position of the drawbar towards the right-hand side which frees the space in front of the left passage 62.

The loading means 58 comprise a fork 84 with two teeth 86 orientated towards the front and parallel to the longitudinal axis. Two bent arms 88 secured to the fork are joined with respect to the plate around a spindle 90 and equipped with maneuvering means 92 around said axis. The maneuvering means 92 comprise a jack which in a first picking-up position makes it possible to place the fork on the ground like a scoop, and in a second raised position in which the arms pivot so as to come closer to vertical, as shown on FIG. 3, enables the plate to be loaded. It is also possible to provide in a particularly advantageous disposition a single jack inserted between the arms and the drawbar 80 to replace the two jacks 82 and 92. In this case, the drawbar is either fastened by wedges and the jack operates the arms, or the drawbar is rotary-free by removing the wedge and the jack operates the arms.

Figure 3:
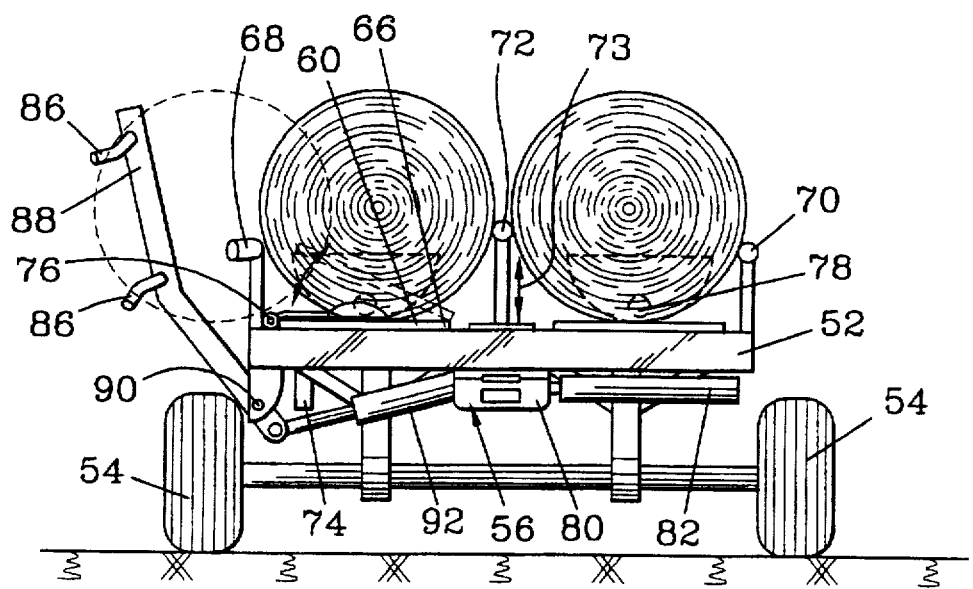
FIG. 3 a side view of the first embodiment of the device of the invention.
Figure 2:
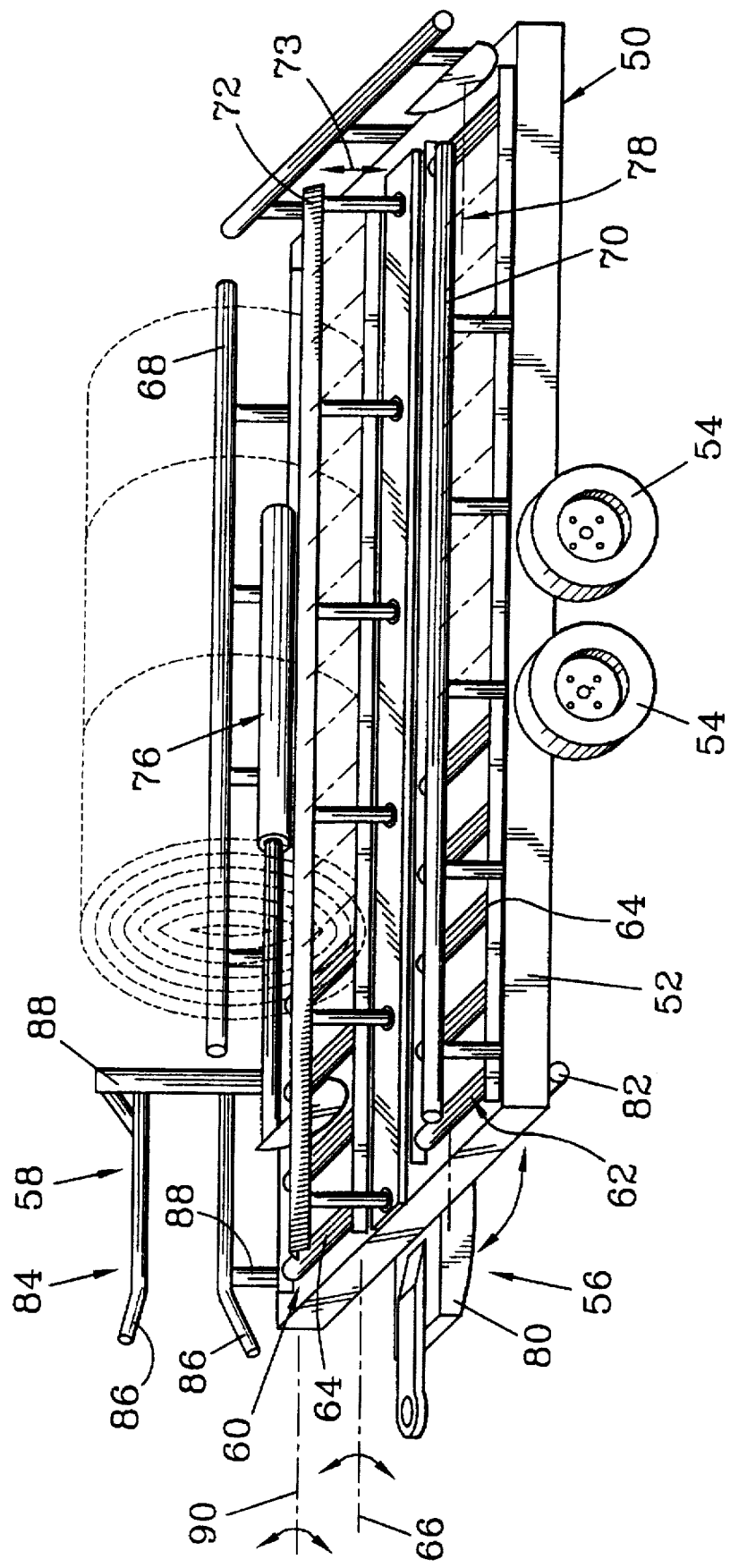
FIG. 2 is a front side view of a first embodiment of the device of the invention.

In FIGS. 2 and 3, some of the bales are represented by broken lines, the ramp 60 being in a slanted position.

The operation of the device of the invention is indicated hereafter by referring to FIGS. 5A to 5D.

The farmer uses a baling press to prepare bales scattered over the worked area as the bales gradually come out of the press.

He also brings the banding machine to the field and places it at the starting point of the site where he wishes to store the balling up of bales.

He then couples the trailer 50, moves about on the field and picks up the bales one at a time.

To do this, he lowers down the arms by maneuvering the jack 92, the teeth 86 forming a scoop picks up each bale, the approach being made at low speed so that winding axis of the bale is parallel to the teeth. The farmer stops when the bale is placed on the teeth and by maneuvering the jack 92, he lifts up the arms so that the bale rolls over and comes to rest on the separator which is in raised position forming a stop. The first bale is thus at the top of the first ramp 60.

The farmer moves again towards another bale and whilst moving he positions the bale which has just been loaded towards the rear of the ramp 60 by actuating the means 76.

He continues this operation until he has completed the passage of the row 60. He then retracts the central separator 72 by actuating the jack 74 and simultaneously makes the ramp 60 pivot around the shaft 66, which has the immediate effect of making the bales roll into the passage corresponding to the ramp 62.

The separator is then lifted up so that it separates once more the two passages defined by the two ramps.

The farmer again completes the passage defined by the ramp 60 so that the trailer is full with a large number of bales, probably about ten.

Figure 5A:
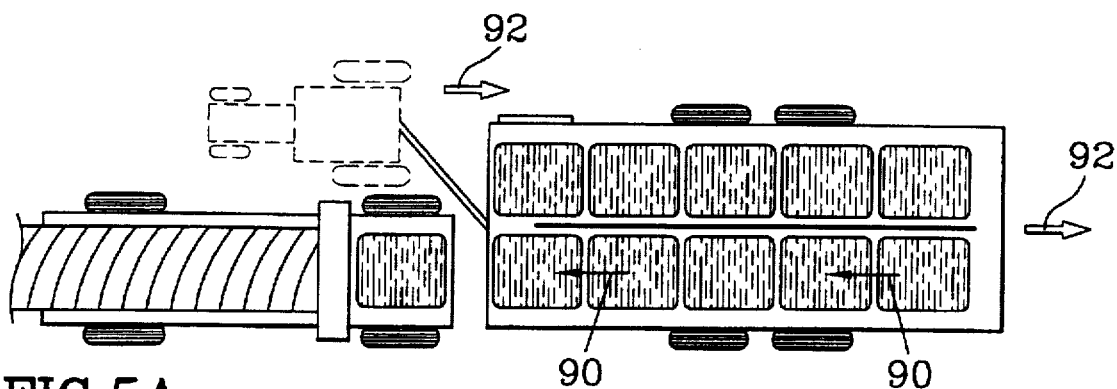
FIGS. 5A to 5D are block diagrams for implementing the device of the invention.
Figure 5B:
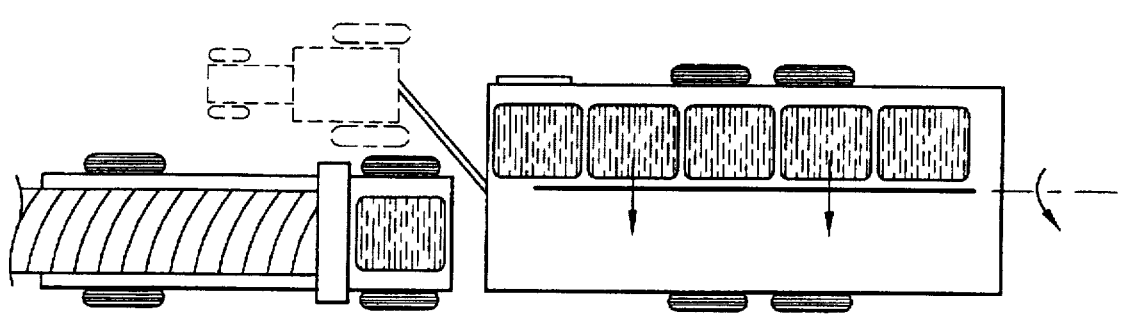

The farmer then goes back to the banding machine which he reaches by firstly maneuvering the jack 82 so as to offset the drawbar so that the trailer 50 can reach the feeding platform of the banding machine by placing the ramp 62 in the alignment of the banding machine, as shown on FIG. 5A.

The farmer can then start up the banding machine and by maneuvering the chain 78, he feeds the platform of the banding machine with the bales placed in the passage corresponding to the ramp 62 by making them move from the rear to the front and through the outlet at the front of the ramp 62 to the platform of the banding machine. This is indicated by the arrows 90 and the consequence is the backward movement of the banding machine but also that of the trailer unit 50 and the tractor via a reaction effect, as indicated by the arrows 92.

The farmer continues this operation until the five bales are tied up and then tilts the bales of the passage defined by the ramp 60 into the passage defined by the ramp 62 so as to fasten the five new bales after the first five ones. This operation is carried out by lowering the separator and pivoting the ramp around the axis 66. This is shown on FIG. 5B.

Figure 5C:
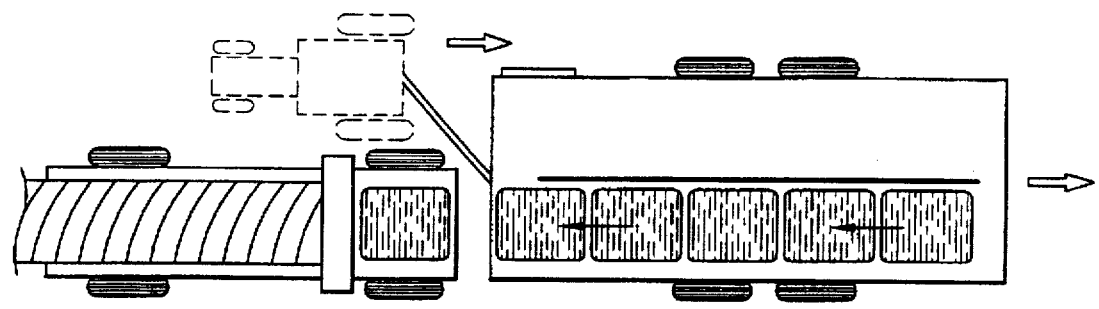
Figure 5D:
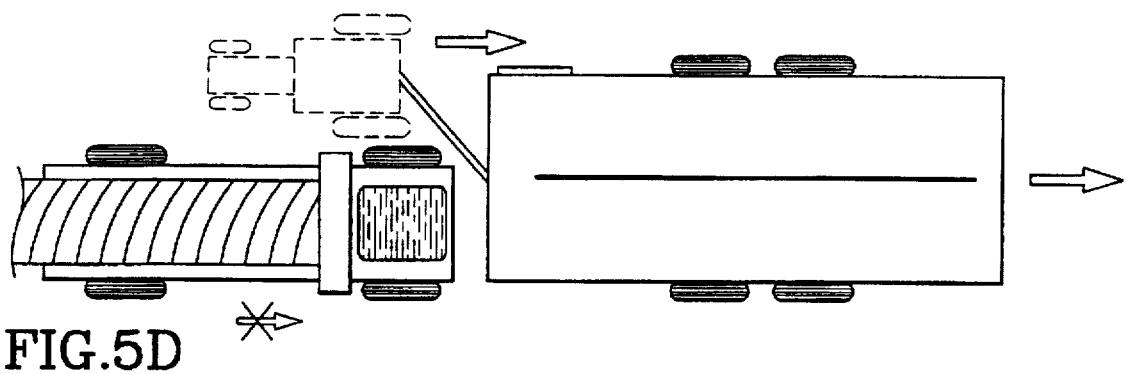

In FIG. 5C, the bales are banded together via a thrust towards the banding machine until the plate no longer contains any bales, which corresponds to the illustration on FIG. 5D.

The banding machine is then stopped and the tractor-trailer unit is separated from the banding machine so as to enable the farmer to carry out a new cycle.

Figure 4:
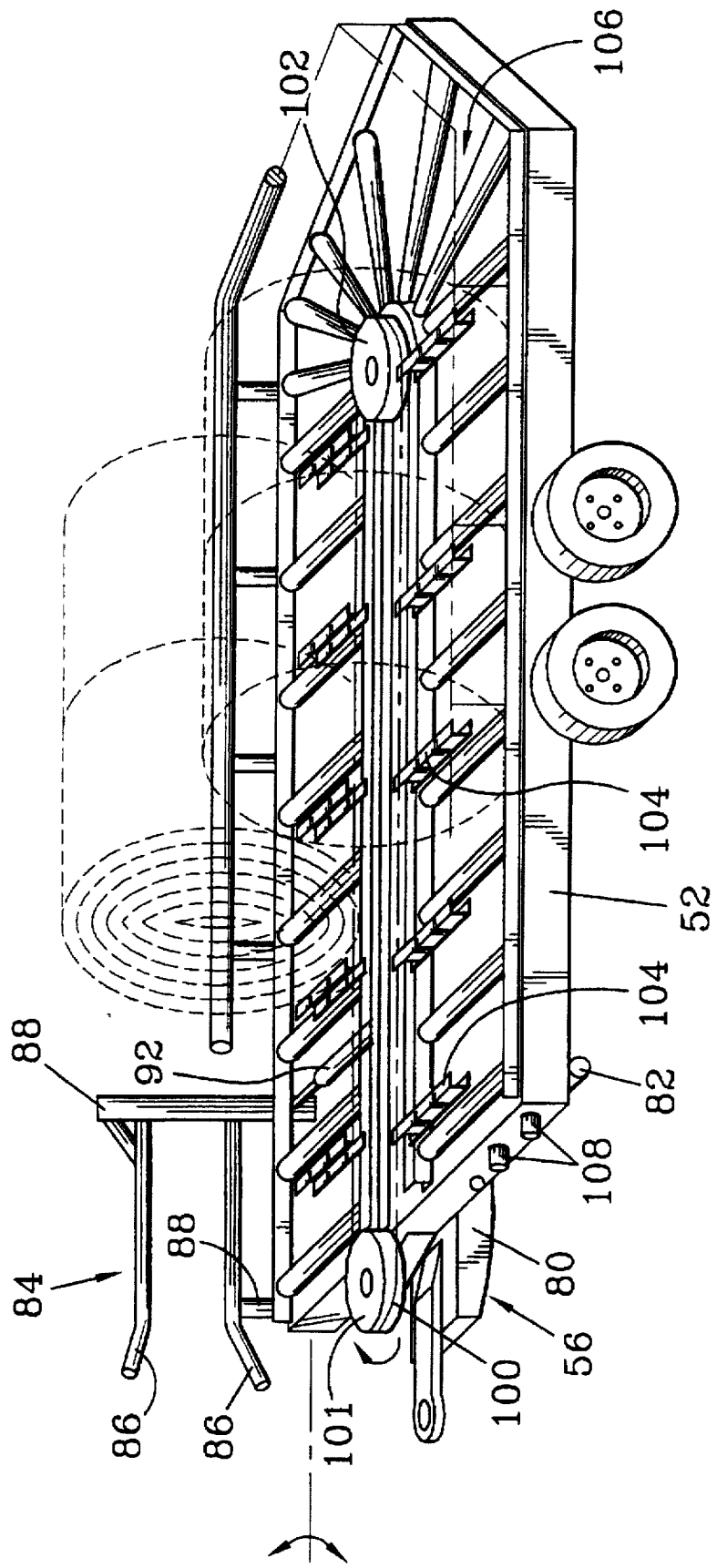
FIG. 4 is a front view of a second mode of embodiment of the device of the invention.

Many variants can be applied and one of them is represented in FIG. 4. In this case, the loading means are identical but the plate or frame has a different disposition. In effect, a chain 100 is provided and is taut between two capstans 101, 102. The chain is placed in the central zone and each of its chain strands is equipped with thrust bars 104 regularly distributed along the chain and are intended to cooperate by pushing with the bales.

Moreover, the plate comprises a U-shaped ramp or guideway 106 whose branches correspond to the ramps 60 to 62 of the previous embodiment.

These branches are equipped with rollers as previously indicated but in the turning movement, the rollers are conical so as to ensure the correct rotation of the bales. The farmer needs to provide any type of guiding rail so as to allow the bale to rotate without being blocked up during this turning movement and being ejected.

This embodiment enables by means of a single chain the bales to circulate one at a time as soon as they are laid on the ramp by the arm 88 which remains unchanged with respect to the previous embodiment.

The other elements making up the trailer also remain unchanged and bear the same references as previously.

The choice of embodiment is dictated by the type of bales and their sizes.

It is possible to envisage adding certain improvements of these embodiments and in particular, it is possible to connect for each banding up cycle tractor hydraulics to the banding machine which avoids installing a special motorization and its maintenance, especially when usage is extremely occasional. This is generally not suitable for thermal engines.

It is also possible to use an automatic hydraulic connection between the trailer and the banding machine, by a precise approach of the trailer and by installing adapted fluid connectors 108 on the trailer and on the banding machine.

In the case of the main embodiment comprising a pivotingly-mounted ramp, it is possible to deliver the bales from the rear of the trailer. This makes it possible to eliminate an orientable coupling but the resultant approach is difficult as the maneuver is a delicate one for the farmer to carry out owing to a total lack of Indeed, the above description concerns round bales but the same is applicable for square bales except for the variant with a U-shaped ramp which could be more difficult to implement.

Similarly, an inclinable ramp can been provided, but this ramp may be permanently fixed and inclined.

The result differs in that the bale placed immediately rolls over the ramp 62 one at a time and not all at once as regards the entire row. In this case, the separator is retracted as soon as loading starts and it is raised after the ramp 62 is completely filled up before filling the ramp 60.

Similarly, a particularly advantageous variant consists of providing a separator retractable by bending inside the longitudinal axis of the trailer. The legs of the separator are joined at the upper portion with respect to the horizontal bar bearing the upturned V and at the lower part with respect to the plate, these axes being transversal. A jack straightens or lowers the separator since the unit forms a ductile parallelogram.

Similarly, another variant consists of resorting to using at least one transversally oriented jack equipped with a thruster and is therefore able to shift the bales from one ramp to another.

Such dispositions are possible for experts in the field and are adapted according to needs.

The ramps are drawn like plates but it is possible to provide cradles shaped in such a way as to cooperate as best as possible with the bales. Tilting in this case is obtained via a pivoting of the two cradles, one having an effect on a retraction of the central portion comprising, for example, articulated rocker bars.

What is claimed is:

1. An agricultural apparatus for collecting and transporting bales and for feeding collected bales to a machine for wrapping the bales, said apparatus comprising:
   a trailer for being moved by a tractor;
   a device for connecting said trailer to the tractor for enabling said trailer to be pulled by the tractor;
   at least one guideway for receiving and supporting the bales on said trailer;
   a device for loading bales onto said trailer and into said at least one guideway;
   said at least one guideway having an outlet for enabling unloading of the bales directly to the bale wrapping machine;
   a device mounted on said trailer for moving the bales along said at least one guideway; and
   means for connecting said trailer to the bale wrapping machine and for aligning said at least one guideway with a platform of the bale wrapping machine for facilitating transfer of the bales directly to the bale wrapping machine from said trailer.

2. An agricultural apparatus according to claim 1, further comprising:
   a hydraulic power unit for operating at least said device for loading bales onto said trailer and into said at least one guideway.

3. An agricultural apparatus according to claim 1, wherein:
   said device for loading bales onto said trailer comprises a fork fitted with teeth parallel to a longitudinal median axis of said trailer and secured to arms perpendicular to said longitudinal median axis of said trailer, said device further comprising means for mounting said fork for pivoting around an axis parallel to said longitudinal median axis of said trailer between a first position at which said fork is at ground level and a second position raised with respect to said first position.

4. An agricultural apparatus according to claim 1, wherein:
   said outlet of said at least one guideway is positioned for enabling unloading of the bales directly to the bale wrapping machine at a position raised with respect to the ground, with the guideway positioned generally horizontally.

5. An agricultural apparatus according to claim 1, wherein:
   said bale wrapping machine comprises a bale banding machine.

6. An agricultural apparatus according to claim 1, wherein:
   said trailer comprises a front and a rear, said trailer has a longitudinal axis oriented between said front and said rear;
   said at least one guideway comprises two juxtaposed guideways substantially parallel to said longitudinal axis, said two guideways comprise a central separator and lateral rails for supporting and guiding the bales; and
   said device mounted on said trailer for moving the bales along said guideway comprises means for moving the bales along each of said two guideways from said front to said rear and from said rear to said front.

7. An agricultural apparatus according to claim 6, wherein:
   at an upper portion, said central separator has an inverted V-shape.

8. An agricultural apparatus according to claim 1, wherein:
   said trailer has a front end and a rear end, said device for connecting said trailer to the tractor is positioned at said front end of said trailer; and
   said outlet of said at least one guideway is positioned at said front end of said trailer.

9. An agricultural apparatus according to claim 8, wherein:
   said at least one guideway comprises means for guiding the bales for movement in a longitudinal direction oriented from said rear end toward said front end of said trailer.

10. An agricultural apparatus for collecting and transporting bales and for feeding collected bales to a machine for wrapping the bales, said apparatus comprising:
    a trailer for being moved by a tractor;
    a device for connecting said trailer to the tractor for enabling said trailer to be pulled by the tractor;
    at least one guideway for receiving and supporting the bales on said trailer;
    a device for loading bales onto said trailer and into said at least one guideway;
    said at least one guideway having an outlet for enabling unloading of the bales directly to the bale wrapping machine;
    a device mounted on said trailer for moving the bales along said at least one guideway; and
    fluid connectors adapted for cooperating with conjugated fluid connectors disposed on the bale wrapping machine.

11. An agricultural apparatus according to claim 10, wherein:
    said fluid connectors comprise means for automatic connection/disconnection.

12. An agricultural apparatus for collecting and transporting bales and for feeding collected bales to a machine for wrapping the bales, said apparatus comprising:
    a trailer for being moved by a tractor;
    a device for connecting said trailer to the tractor for enabling said trailer to be pulled by the tractor;
    at least one guideway for receiving and supporting the bales on said trailer;
    a device for loading bales onto said trailer and into said at least one guideway;
    said at least one guideway having an outlet for enabling unloading of the bales directly to the bale wrapping machine;

a device mounted on said trailer for moving the bales along said at least one guideway;

means for connecting said trailer to the bale wrapping machine and for aligning said at least one guideway with a platform of the bale wrapping machine for facilitating transfer of the bales directly to the bale wrapping machine from said trailer; and said device for connecting said trailer to the tractor for enabling said trailer to be pulled by the tractor comprising a drawbar and means for adjusting a position of said drawbar with respect to said trailer.

13. An agricultural apparatus for collecting and transporting bales and for feeding collected bales to a machine for wrapping the bales, said apparatus comprising:

a trailer for being moved by a tractor;

a device for connecting said trailer to the tractor for enabling said trailer to be pulled by the tractor;

at least one guideway for receiving and supporting the bales on said trailer;

a device for loading bales onto said trailer and into said at least one guideway;

said at least one guideway having an outlet for enabling unloading of the bales directly to the bale wrapping machine;

a device mounted on said trailer for moving the bales along said at least one guideway;

said trailer comprising a front and a rear, said trailer having a longitudinal axis oriented between said front and said rear;

said at least one guideway comprising two juxtaposed guideways substantially parallel to said longitudinal axis, said two guideways comprising a central separator and lateral rails for supporting and guiding the bales;

said device mounted on said trailer for moving the bales along said at least one guideway comprising means for moving the bales along each of said two guideways from said front to said rear and from said rear to said front;

said agricultural apparatus further comprising:

means for mounting a lower supporting surface of one of said two guideways for pivoting about an axis parallel to said longitudinal axis of said trailer, said parallel axis being positioned at a lateral side of said one of said two guideways proximate said central separator; and means for moving said supporting surface of said one of said two guideways between a low, generally horizontal position and a position whereby said supporting surface is slanted toward a second of said two guideways for transferring bales from said one to said second of said two guideways.

14. An agricultural apparatus for collecting and transporting bales and for feeding collected bales to a machine for wrapping the bales, said apparatus comprising:

a trailer for being moved by a tractor;

a device for connecting said trailer to the tractor for enabling said trailer to be pulled by the tractor;

at least one guideway for receiving and supporting the bales on said trailer;

a device for loading bales onto said trailer and into said at least one guideway;

said at least one guideway having an outlet for enabling unloading of the bales directly to the bale wrapping machine;

a device mounted on said trailer for moving the bales along said at least one guideway;

said trailer comprising a front and a rear, said trailer having a longitudinal axis oriented between said front and said rear;

said at least one guideway comprising two juxtaposed guideways substantially parallel to said longitudinal axis, said two guideways comprising a central separator and lateral rails for supporting and guiding the bales;

said device mounted on said trailer for moving the bales along said at least one guideway comprising means for moving the bales along each of said two guideways from said front to said rear and from said rear to said front;

said agricultural apparatus further comprising means for mounting a lower supporting surface of one of said two guideways in a position slanted transversely towards a second of said two guideways.

15. An agricultural apparatus for collecting and transporting bales and for feeding collected bales to a machine for wrapping the bales, said apparatus comprising:

a trailer for being moved by a tractor;

a device for connecting said trailer to the tractor for enabling said trailer to be pulled by the tractor;

at least one guideway for receiving and supporting the bales on said trailer;

a device for loading bales onto said trailer and into said at least one guideway;

said at least one guideway having an outlet for enabling unloading of the bales directly to the bale wrapping machine; and a device mounted on said trailer for moving the bales along said at least one guideway;

said at least one guideway consisting of a single U-shaped guideway, said U-shaped guideway comprising a series of rollers for supporting the bales for movement thereover; and said device mounted on said trailer for moving the bales along said at least one guideway comprising a closed loop chain trained around a pair of capstans mounted at opposite ends of said trailer along a longitudinal median axis of said trailer, said chain bearing regularly spaced bars for engaging and pushing the bales.

16. An agricultural apparatus for collecting and transporting bales and for feeding collected bales to a machine for wrapping the bales, said apparatus comprising:

a trailer for being moved by a tractor;

a device for connecting said trailer to the tractor for enabling said trailer to be pulled by the tractor;

at least one guideway for receiving and supporting the bales on said trailer;

a device for loading bales onto said trailer and into said at least one guideway;

said at least one guideway having an outlet for enabling unloading of the bales directly to the bale wrapping machine;

a device mounted on said trailer for moving the bales along said at least one guideway;

said trailer having a front end and a rear end, said device for connecting said trailer to the tractor being positioned at said front end of said trailer;

said outlet of said at least one guideway being positioned at said front end of said trailer;

said at least one guideway comprising means for guiding the bales for movement in a longitudinal direction oriented from said rear end toward said front end of said trailer;

said device for connecting said trailer to the tractor comprising a drawbar and means for moving said drawbar transversely of said longitudinal direction from a central position at said front end to a position offset from said central position.

17. An agricultural apparatus for collecting and transporting bales and for feeding collected bales to a machine for wrapping the bales, in combination with said machine for wrapping the bales, said combination comprising:

a trailer for being moved by a tractor;

a device for connecting said trailer to the tractor for enabling said trailer to be pulled by the tractor;

at least one guideway for receiving and supporting the bales on said trailer;

a device for loading bales onto said trailer and into said at least one guideway;

said at least one guideway having an outlet for enabling unloading of the bales directly to the bale wrapping machine; and a device mounted on said trailer for moving the bales along said at least one guideway;

means for connecting said trailer to the bale wrapping machine and for aligning said at least one guideway with a platform of the bale wrapping machine for facilitating transfer of the bales directly to the bale wrapping machine from said trailer; and said bale wrapping machine comprises a receiving platform positionable proximate said outlet of said at least one guideway for directly receiving the bales from said outlet.

18. An agricultural apparatus according to claim 17, wherein:

said bale wrapping machine comprises a bale banding machine.

* * * * *